United States Patent
Goth

(10) Patent No.: US 6,379,086 B1
(45) Date of Patent: Apr. 30, 2002

(54) APPARATUS FOR CONVEYING GRANULAR PLASTIC MATERIAL

(75) Inventor: Gerhard Goth, Benningen (DE)

(73) Assignee: Mann & Hummel Protec GmbH, Ludwigsburg (DE)

( * ) Notice: Subject to any disclaimer, the term of this patent is extended or adjusted under 35 U.S.C. 154(b) by 0 days.

(21) Appl. No.: 09/531,765

(22) Filed: Mar. 20, 2000

(30) Foreign Application Priority Data

Mar. 18, 1999 (DE) .......................................... 199 12 277

(51) Int. Cl.[7] .............................................. B65G 53/44
(52) U.S. Cl. ............................ 406/75; 406/34; 406/35; 406/130; 406/132; 406/152; 406/169
(58) Field of Search .............................. 406/31, 32, 33, 406/34, 35, 75, 127, 130, 132, 135, 151, 152, 168, 169

(56) References Cited

U.S. PATENT DOCUMENTS

| | | | | |
|---|---|---|---|---|
| 2,715,551 A | * | 8/1955 | Kiernan ........................ 302/55 |
| 2,764,316 A | * | 6/1956 | Sylvest ........................ 222/55 |
| 3,186,770 A | * | 6/1965 | O'Neal ........................ 302/42 |
| 3,410,530 A | * | 11/1968 | Gilman ........................ 259/4 |
| 3,570,716 A | * | 3/1971 | Kirsanoff ..................... 222/67 |
| 3,645,582 A | * | 2/1972 | Siemetzki .................... 302/35 |
| 3,920,229 A | | 11/1975 | Piggott ........................ 259/192 |
| 4,217,996 A | | 8/1980 | Good ........................... 222/404 |
| 4,486,100 A | * | 12/1984 | Endo et al. ................... 366/76 |
| 4,583,885 A | * | 4/1986 | Thiele ......................... 406/168 |
| 5,042,209 A | * | 8/1991 | Furrer et al. ................. 51/411 |
| 5,213,724 A | | 5/1993 | Saatkamp ..................... 264/37 |
| 5,478,172 A | * | 12/1995 | Oura et al. ................... 406/23 |
| 5,575,596 A | * | 11/1996 | Bauer et al. .................. 406/168 |
| 5,634,713 A | * | 6/1997 | Abe ............................. 366/102 |
| 6,056,483 A | * | 5/2000 | Nakamura et al. ........... 406/134 |

FOREIGN PATENT DOCUMENTS

| | | |
|---|---|---|
| DE | 43 28 071 | 2/1995 |
| EP | 0 911 131 | 4/1999 |
| FR | 2 663 259 | 12/1991 |
| FR | 2 696 161 | 4/1994 |

OTHER PUBLICATIONS

Publication VKD 415 of Filterwerk Mann & Hummel GmbH.
Publication VKD 439 of Filterwerk Mann & Hummel GmbH.

* cited by examiner

Primary Examiner—Christopher P. Ellis
Assistant Examiner—Joe Dillon, Jr.
(74) Attorney, Agent, or Firm—Crowell & Moring LLP

(57) ABSTRACT

An apparatus for conveying granular plastic materials, for example silicone granulate, including a storage tank, a device for loosening granular plastic material positioned within the storage tank, as well as a discharge device for indirectly or directly transporting granular material to an extruder antechamber. Even granular plastic materials that are difficult to pour can be conveyed in a reliable and economical way due to the process of loosening the granular plastic materials by means of a suitable device.

16 Claims, 2 Drawing Sheets

APPARATUS FOR CONVEYING GRANULAR PLASTIC MATERIAL

BACKGROUND OF THE INVENTION

This invention relates to an apparatus for conveying granular plastic material. Apparatuses of this kind are known and described, for example, in the publication VKD 415 from Filterwerk Mann & Hummel GmbH. These apparatuses serve to convey granular plastic materials of various compositions from silos to injection-molding machines. For this purpose, it is necessary to execute different processing steps, as, for instance, mixing various components and/or adding color pigments, proportioning and weighing the individual components, drying the granular plastic materials in appropriate drying devices and distributing the material flows to different processing systems.

Conveying devices such as, for example, those described in the publication VKD 439 from Mann & Hummel ProTec GmbH of MANN+HUMMEL ProTec GmbH have proven to be useful, particularly for conveying granular plastic materials. Such conveying devices serve to automatically charge tanks, balances, mixing and proportioning devices, as well as processing systems. They usually comprise a conveyor station and a blower station. With the known types of apparatuses for conveying granular plastic materials, it has been possible to process many types of plastic materials. Practice has shown, however, that types of granular materials which exhibit a high cohesiveness, such as, for example, silicone granules, tend to cake or to form lumps within the conventional conveying devices, thereby causing complications during the conveying process. Especially silicone in the form of blocks, strands or ribbons has been fed to the extruders of injection-molding machines by means of suitable feeding devices or stuffing devices. This process requires very complicated feeding devices and does not enable any proportioning or mixing of various components.

SUMMARY OF THE INVENTION

It is therefore the object of this invention to provide an apparatus for conveying granular plastic materials which enables processing and distribution of granular materials that in the past have been difficult to convey.

These and other objects have been achieved in accordance with the present invention by providing an apparatus for conveying a granular plastic material comprising a storage tank, a device for loosening granular plastic material disposed within the storage tank, and a discharge device for transporting the granular material to an extruder antechamber.

The substantial advantage of the present invention is that the storage tank provided for the granular plastic material comprises a device for loosening the plastic granules as well as a discharging device directly or indirectly feeding the granular material to an extruder antechamber. The device for loosening the granular plastic material may be, for example, a stirring arm or a stirring plate with blades arranged thereon, for gently keeping the granular material in motion. Another function of the stirring arm or stirring plate is to pre-proportion the material and then to feed it to the discharging device. In this case it is likewise necessary that the material be treated carefully.

It is also possible to use other mechanical devices or fluidizing devices which keep the granular material near the material discharging region in motion.

In accordance with another embodiment of the invention, the discharging device comprises a suction device in which the suction line is not supposed to extend in rising direction, so that it is assured that the granular material to be conveyed does not tend to form lumps.

Another embodiment of the invention is to arrange the device for sucking up material from the storage tank at a position where the granular plastic material is being loosened. It is furthermore advantageous to supply the fresh air portion required for operation of the suction device to the storage tank directly in this region, and to adjust the air supply continuously by means of suitable shutters or the like.

In accordance with a further embodiment of the present invention, a so-called granulate retaining element is provided at the suction outlet, so that it is not possible to take too much granular material from the storage tank via the suction device. This granulate retaining element is likewise adjustable and can be adapted to the material flow which is to be conveyed.

As can be seen, for example, from the aforementioned publication VKD 439, the conveying and suction process are carried out by means of conventional conveying devices. The conveying devices are advantageous because they have a compact structure and a separate blowing station, and the conveying process can be regulated variably.

Another embodiment of the invention is to arrange an intermediate hopper downstream of the conveying device. This intermediate hopper consists essentially of a slim, vertical pipe, i.e., a pipe having a relatively small diameter compared to its length. The advantage of this structure is that it is thus possible to reliably prevent the granular plastic materials from forming lumps or from agglomerating.

In another preferred embodiment of the invention, the intermediate hopper, i.e., that the pipe, comprises two parts. The upper part of the pipe is arranged rigidly, which means it is fixed rigidly to the mounting. The lower part is connected to a vibratory feeder. The vibratory feeder serves to proportion the granular plastic material into the extruder antechamber. The rigid connection between the vibratory feeder and the lower part of the intermediate hopper enables reliable transport of the granular plastic material from the intermediate hopper into the vibratory feeder. The upper and lower parts of the intermediate hopper are interconnected by means of a flexible collar.

In order to monitor, control and/or regulate the apparatus in an advantageous manner, sensors for detecting the filling level are arranged on various vessels. The sensor signals can be supplied to an electronic control device, whereupon the control device will adjust the system to the respective granular material required for the injection-molding machine and will likewise recognize any disruptions in the operation of the system.

These and other features of the preferred further embodiments of the invention are set out not only in the claims, but also in the description and in the drawings, it being possible for the individual features to be realized individually or jointly in the form of subcombinations in embodiments of the invention and also in other fields, and constituting independently patentable embodiments for which protection is hereby claimed.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figure 1:
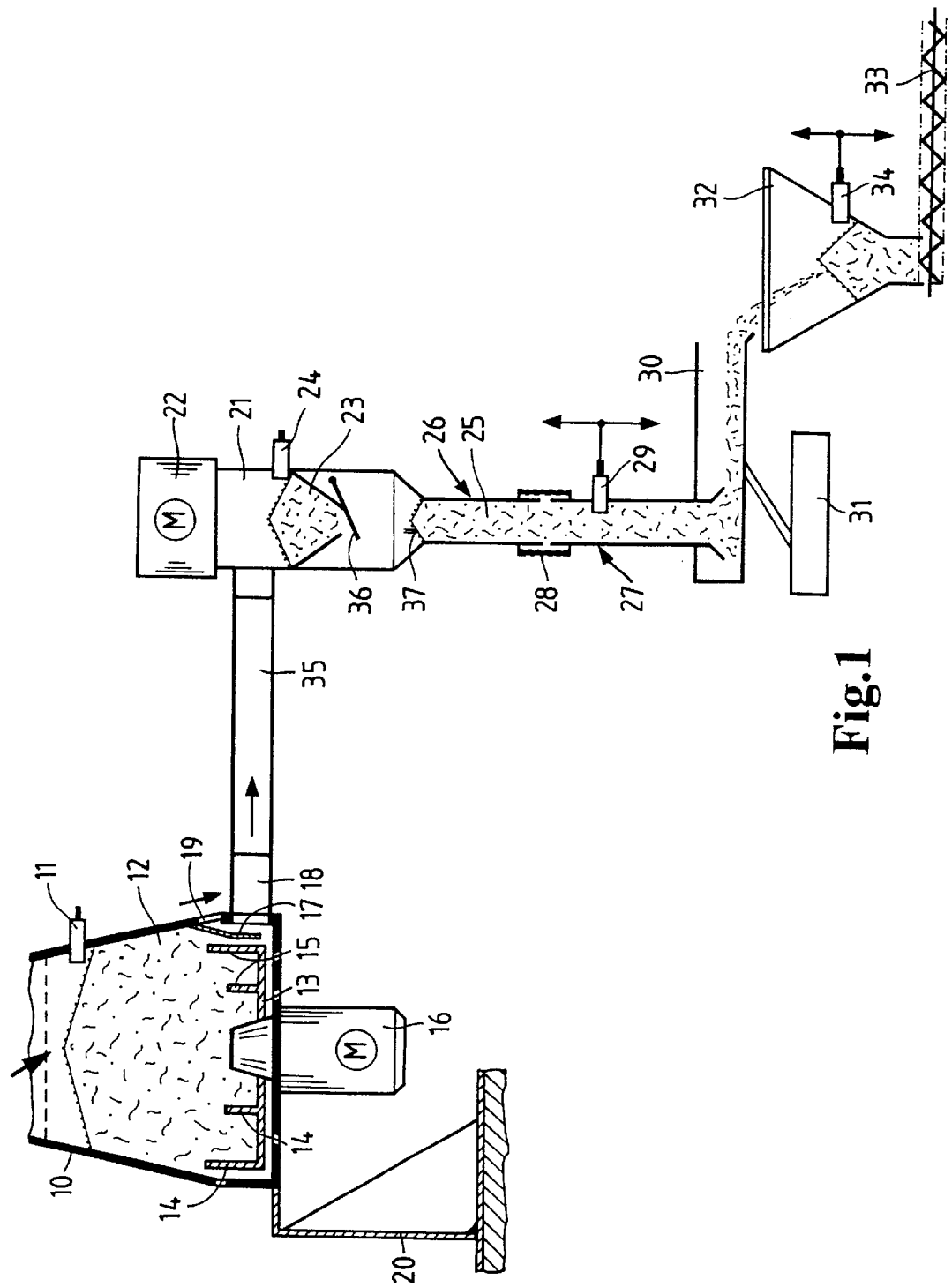
FIG. 1 shows a schematic illustration of an apparatus for conveying granular plastic materials.

The schematic illustration according to FIG. 1 comprises a storage tank 10 including a filling level sensor 11 and, at the bottom of the storage tank, a device for loosening the granular plastic material 12 found within the tank. In this preferred embodiment, the device for loosening the granular plastic material is a stirring arm 13, with blades 14 and 15 fastened thereon. The stirring arm is driven by a motor 16. A granulate retaining element 17 is adjustably arranged within the storage tank 10 close to the discharge device 18. An opening 19 for feeding fresh air is located above the discharge device 18. The area of this opening can be varied so that it is possible to regulate the supply of fresh air. The cross-section of the storage tank 10 enlarges towards its base, thus preventing the material from caking or forming bridges. The storage tank is arranged on a suitable mounting 20. The discharge device 18 is a pipe connected to a conveying device 21. This conveying device comprises a suction blower 22 as well as a tank 23 including a closeable base and a filling level sensor 24.

An intermediate hopper 25 is arranged under the conveying device 21. This intermediate hopper comprises an upper part 26 and a lower part 27. Both parts are interconnected by means of a flexible collar 28. The intermediate hopper is likewise equipped with a filling level sensor 29, which is arranged in such a way that it can be shifted either up or down to vary the level of the granular material in the hopper. The lower part 27 of the intermediate hopper is rigidly connected to a vibratory feeder or chute 30. This vibratory feeder 30 is activated by a vibrating drive 31 and serves to proportion the granular plastic material into an extruder antechamber 32. An extruder 33 or an injection molding machine is positioned directly below the extruder antechamber.

Another sensor 34 can be arranged in the extruder antechamber. A relatively slow rotation of the stirring arm 13 keeps the material contained in the storage tank 10, for example silicone granulate, in motion. The suction blower 22 sucks the material out of the storage tank 10 into the conveying device 21, thereby passing through the discharging device 18 and the connection line 35. As soon as a predetermined filling level is reached in the conveying device, a flap 36 of tank 23 will open, discharging the tank's content into the intermediate hopper 25. The content of hopper 25 is fed to the extruder 33 or the extruder antechamber 32, respectively, via the vibratory feeder.

An important provision in order to prevent the silicone granulate from forming lumps and bridges is that the intermediate hopper 25 is only filled up to its upper edge 37. Filling the tank to the maximum permissible extent can be achieved without difficulty by sensing the filling height using a suitable filling level sensor operably connected to a suitable process control device, such as a programmable electronic controller.

Figure 2:
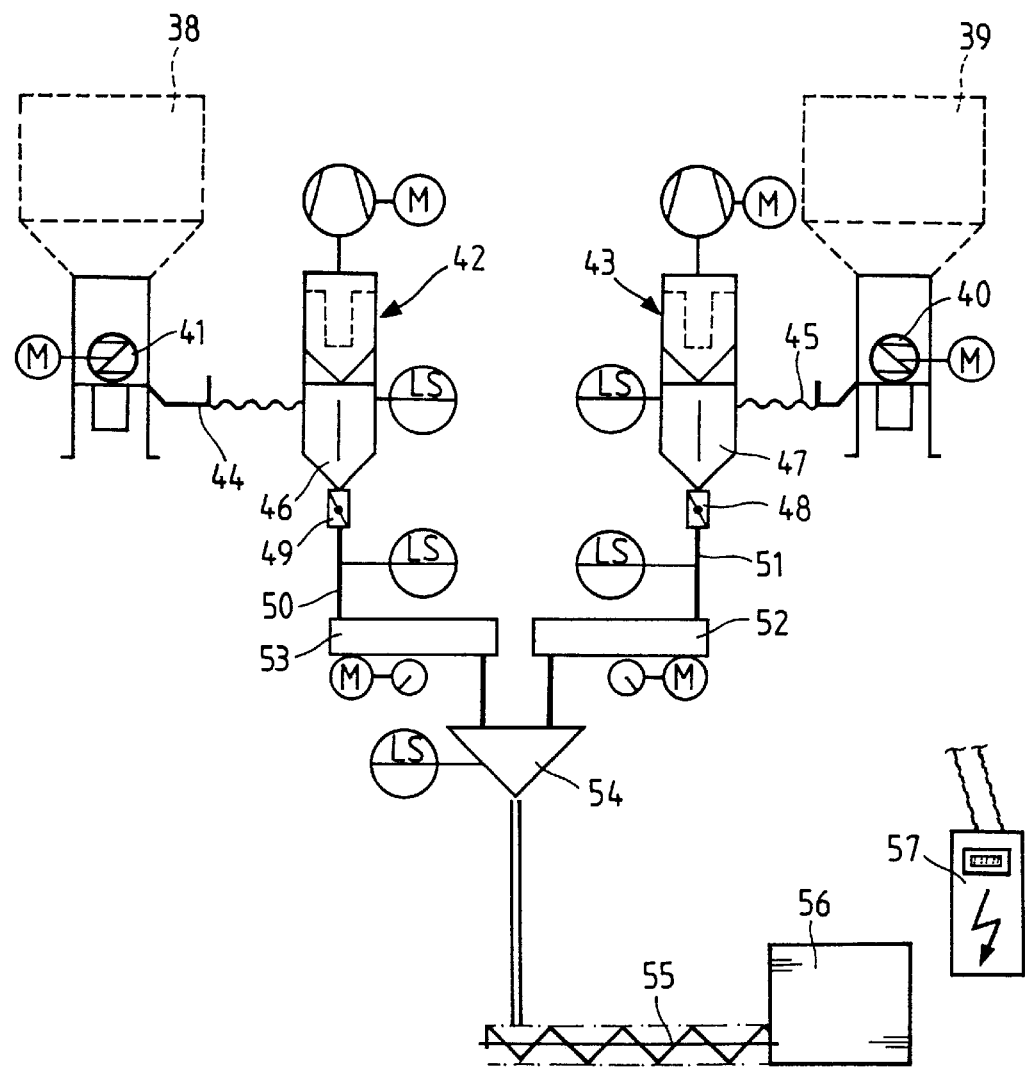
FIG. 2 shows an apparatus for conveying two material components.

FIG. 2 shows an apparatus by means of which two different components of plastic material can be fed to an extruder or an injection-molding machine, respectively. The storage tanks 38 and 39 are, for example, filled with silicone granulate. Stirring devices 40 and 41 are arranged in the bottom regions of the respective storage tanks to keep the silicone granulate in motion. Again in this case, the material is discharged by means of conveying devices 42 and 43. The conveying devices are operated under vacuum and convey the granular plastic materials via the pipes 44 and 45 into the tanks 46 and 47, from where the respective granular plastic materials reach the tubular intermediate hoppers 50 and 51 via flaps 48 and 49. These intermediate hoppers are likewise each constructed of one lower and one upper part. Each lower part is coupled to one of the vibratory feeders or chutes 52 and 53. The vibratory feeders discharge directly into the extruder antechamber 54, from where the material reaches the extruder 55 or the injection-molding machine.

The motors M are entirely controlled by means of the control device 57, in response to the filling levels detected by the sensors LS, wherein the necessary connection wires are not shown in the present schematic illustration.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. An apparatus for conveying a granular plastic material comprising a storage tank, a device for loosening granular plastic material disposed within said storage tank, a discharge device for transporting the granular material to an extruder antechamber, a conveying device arranged between said storage tank and the extruder antechamber, and an intermediate hopper arranged to receive said granular plastic material from said conveying device;

wherein the discharge device is a suction pipe extending horizontally or in a descending direction from said storage tank to said conveying device;

said conveying device is supplied with granular plastic material by said suction device; and and said intermediate hopper consists essentially of a vertical pipe having an elongated configuration, said intermediate hopper receiving all of the granular plastic material.

2. An apparatus according to claim 1, wherein said granular plastic material is a silicone granulate.

3. An apparatus according to claim 1, further comprising a sensor disposed on said intermediate hopper for detecting the filling level of granular plastic material in said intermediate hopper.

4. An apparatus according to claim 1, further comprising a sensor disposed on said conveying device for detecting the filling level of granular plastic material in said conveying device.

5. An apparatus according to claim 1, wherein said suction device is arranged in the direct vicinity of said device for loosening granular plastic material, and said device for loosening granular plastic material is a rotating stirring arm.

6. An apparatus according to claim 1, further comprising means for continuously adjusting the amount of fresh air provided for said suction device, and an adjustable granulate retaining baffle arranged at a suction outlet of said suction device.

7. An apparatus according to claim 1, wherein said intermediate hopper comprises upper and lower parts, said lower part being rigidly connected to a vibrator conveyor arranged in a lower region of said intermediate hopper, and said upper part being connected to said lower part via a flexible collar.

8. An apparatus according to claim 7, wherein the granular plastic material is proportioned and fed to the extruder antechamber via said vibrator conveyor.

9. An apparatus according to claim 1, further comprising an electronic controller for controlling operating cycles of said apparatus from loosening the granular plastic material within the storage tank to proportioning the granular plastic material within the extruder antechamber, said electronic controller being programmed to recognize disruptions in operation of said apparatus and sound an alarm or shut down the apparatus upon occurrence of a disruption.

10. An apparatus according to claim 9, wherein said electronic controller is an an SPS-control.

11. An apparatus according to claim 1, further comprising a sensor disposed on said extruder antechamber for detecting the filling level of granular plastic material in said extruder antechamber.

12. An apparatus according to claim 11, wherein said sensor is adjustable in stages to detect various filling heights in said extruder antechamber.

13. An apparatus according to claim 11, wherein said sensor is continuously adjustable to detect various filling heights in said extruder antechamber.

14. An apparatus according to claim 1, further comprising a sensor disposed on said storage tank for detecting the filling level of granular plastic material in said storage tank.

15. An apparatus according to claim 14, wherein said sensor is adjustable in stages to detect various filling heights in said storage tank .

16. An apparatus according to claim 14, wherein said sensor is continuously adjustable to detect various filling heights in said storage tank.

* * * * *